United States Patent Office 3,075,952
Patented Jan. 29, 1963

3,075,952
SOLID PHASE PROCESS FOR LINEAR SUPERPOLYESTERS
Harry W. Coover, Jr., Frederick B. Joyner, and Newton H. Shearer, Jr., all of Kingsport, Tenn., assignors to Eastman Kodak Company, Rochester, N.Y., a corporation of New Jersey
No Drawing. Filed Jan. 21, 1959, Ser. No. 788,043
22 Claims. (Cl. 260—75)

This invention relates to a solid phase process for preparing a linear superpolyester of a glycol and a dibasic acid having a molecular weight of at least about 15,000 ranging upward to 100,000 or more and having inherent viscosities of at least about 0.5. This invention more particularly relates to the use of titanium catalysts in such a process and the employment of the solid phase polymerization under approximately atmospheric pressure of an inert gas which is moved through the polymerization zone.

This invention also relates to other aspects of solid phase polymerization and the improved polymers obtained.

Although the prior art contains a number of disclosures concerning solid phase polymerization of condensation polymers, it is generally considered that a vacuum is most advantageous during the solid phase polymerization. Thus, it is generally supposed that the rate of polymerization is inversely proportional to some mathematical function of the pressure of gas in the polymerization zone.

According to a particular unobvious aspect of the present invention it has been found that the solid phase polymerization can be conducted under approximately atmospheric pressure of an inert gas when the particles of a prepolymer are prepared by a process which involves the use of a titanium catalyst. Other unobvious features of this invention will also be disclosed hereinafter.

It is an object of this invention to provide a solid phase polymerization process wherein it is unnecessary to employ a vacuum during the polymerization of the solid particles to form the desired superpolyester.

It is a further object of this invention to provide a rapid efficient process for increasing the molecular weight of polyester prepolymers without causing discoloration or otherwise changing their physical form.

Another object of this invention is to provide a solid phase polymerization process for producing superpolyesters which can be readily conducted by a continuous operation.

Other objects will become apparent elsewhere herein.

According to a preferred embodiment of this invention there is provided a process for preparing a linear superpolyester of at least one glycol and at least one dibasic acid comprising at least 50 mole percent of an acid having two carboxyl radicals attached to a carbocyclic nucleus having from 4 to 6 carbon atoms per ring, said superpolyester having a number average molecular weight of 15,000 to about 100,000, an inherent viscosity in a mixture of 60% phenol and 40% tetrachloroethane of at least 0.75 and melting at from about 180° to about 350° C., comprising three phases as follows:

(1) Heating from 1.05 to 2.5 mole proportions of said glycol with one mole proportion of said dibasic acid in a form selected from the group consisting of the free acid, a lower alkyl (1 to 6 carbons) ester, anhydride and acid chloride, under conditions such that at first there is removed substantially all of any water, hydrogen chloride and alkanol corresponding to said forms of said dibasic acid and mostly subsequent thereto there is removed most of the excess of said glycol whereby an intermediate polyester prepolymer having an inherent viscosity of from about 0.1 to about 0.45 is obtained, said conditions being such that after any water and hydrogen chloride has been removed and before any substantial amount of said glycol is removed there is present at least one catalyst including an organo-titanium compound selected from the group consisting of those having the following formulas:

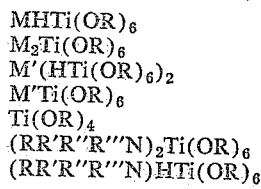

wherein each R represents an alkyl radical containing from 1 to 6 carbon atoms, each of R', R'' and R''' represents a member of the group consisting of an alkyl radical containing from 1 to 6 carbon atoms and an aryl radical of the benzeen series containing from 6 to 9 carbon atoms, each M represents an alkali metal atom, and each M' represents an alkaline earth metal atom selected from the group consisting of Mg, Ca and Sr, (2) Comminuting said prepolymer to form solid particles substantially completely passing a 20 mesh screen with less than 25% passing a 200 mesh screen, and (3) In an enclosed polymerizing zone wherein at least 5% of the volume is occupied by said particles, heating at from 5° to 80° C. below the melting point of said prepolymer and between 175° and 300° C. in the presence of an inert gas at about atmospheric pressure which flows through said zone at from about 10 to about 1,000 ml. of inert gas per minute per gram of said particles, any of said particles more than 5 mm. from the surface being agitated into contact with said inert gas, whereby a substantially colorless superpolyester having an inherent viscosity of at least 0.5 and generally greater than 0.75 is obtained within one hour or less of commencing said heating in said polymerization zone, said inherent viscosity being at least 0.3 unit greater than for said prepolymer and usually 0.4 or more units greater.

The detailed aspects of the described process will be readily apparent to those having ordinary skill in this art since the preparation of polyesters such as polyethylene terephthalate which are fiber and film forming has now been understood by such persons for a good number of years and the literature and patented art are quite extensive in regard to this subject matter. It is therefore unnecessary to indulge in a lengthy discussion of numerous ramifications of this invention which would be readily apparent.

The inert gas which can be employed in accordance with the process of this invention can be any of those which are ordinarily employed in the handling of polyesters in accordance with the prior art. Such inert gases include nitrogen, carbon dioxide, helium, propane, mixtures of such gases and other related gases.

One of the surprising aspects of this invention is the fact that the inert gas need not be entirely free of oxygen. This makes it possible to employ gases readily available from various industrial operations such as various combustion gases which have been dried to remove moisture and if necessary treated to insure that they do not contain more than about 0.1% by weight of carbon monoxide.

As shown in one of the examples hereinbelow it is possible to use the process of this invention employing dry air in lieu of the inert gas although it is apparent that this can only be done satisfactorily when a short period of polymerization is employed and some discoloration is not objectionable. The use of dry air would be commercially feasible when the polyester produced is intended for use as a molding resin or in the preparation of products wherein the color is either inconsequential or will be masked by the presence of other coloring materials such as carbon black, dyes, pigments, etc.

As set forth hereinabove the described embodiment of this invention always employs a titanium catalyst. Preferably, the titanium catalysts listed above are employed. It is generally advantageous to use a simple titanium alcoholate as described in U.S. 2,727,881. However, any of the other titanium catalysts described in that patent or in U.S. 2,720,502 can be employed. Under some circumstances titanium dioxide is also useful.

For some reason it appears that the titanium catalysts have some specific applicability to the present process which is not generally possessed by other catalysts although it is supposed that there may be some other catalysts which can be employed.

The polyesters which can be produced in accordance with this invention include any of those mentioned in the above cited patents 2,727,881 and 2,720,502. In addition, any of the polyesters described in Kibler et al. application S.N. 554,639, filed December 22, 1955, "Linear Polyesters and Poly-Ester Amides From 1,4-Cyclohexanedimethanol," now U.S. Patent 2,901,466, are also contemplated within the scope of this invention. This also applies to a particular class of the latter polyesters which can be abnormalized as described in the copending application of Kibler et al., Serial No. 801,705, filed on March 25, 1959; the abnormalization process can be accomplished using the techniques of the present invention in two stages, the first stage being for at least 1½ hours at well under 10 ml./min./g. and the second stage being at over 10 ml./min./g.

Phase 1 as set forth hereinabove is analogous to similar phases in the preparation of polyesters in accordance with the techniques well known in the art with the principal exception that it is limited to the special catalysts. This phase can be conducted as a single operation or can be divided into two separate steps. In the latter case it is sometimes advantageous to perform the initial ester interchange between the glycol and the dibasic acid components in a batch reactor or in a column equipped with plates. Of course other apparatus can also be employed. The reactor or column is advantageously equipped with a reflux device such as a packed column which returns to the reaction zone any of the glycol which might otherwise be lost during the ester interchange step. The lower alkanol is removed from the ester interchange zone. The second step of this first phase can then be accomplished advantageously by heating the ester interchange product in a batch reactor or some other suitable reaction vessel so as to remove a substantial proportion of the glycol in excess of that required to form a polyester. This step is normally advantageously accomplished under reduced pressure which facilitates the removal of the glycol.

The second phase of the described process involving the comminuting of the prepolymer can be accomplished in any convenient manner as long as the particles produced come within the size requirements set forth. According to one method the prepolymer can be cast as a thick sheet of the product of phase 1 and allowed to cool slowly whereby it can be readily broken into small pieces. These pieces can then be ground in any of the commonly available grinding machines so as to produce particles of the appropriate sizes. The slow cooling of the prepolymer as a thick sheet facilitates its developing a crystalline form which makes subsequent comminution relatively easy. Crystallization with regard to the material used to form the comminuted particles is not only useful in preparing the comminuted particles, but it is also advantageous in accomplishing the final polymer buildup.

If it is desired to enhance the crystallinity of the particles of prepolymer to be used as set forth in phase 2, this can be accomplished by contacting the particles with an organic volatile liquid compound which is allowed to permeate the particles for a period of time sufficient to permit a high order of crystallization to be achieved. The particles containing the volatile organic liquid can then be heated at an adequate temperature to evaporate the liquid and leave the particles dry. If necessary, the dried particles can be subjected to further mechanical action to cause them to have the appropriate sizes. By employing this additional operation of further enhancing the crystallinity of the prepolymer particles the ultimate results achieved in accordance with this invention can be significantly improved.

In preparing the solid particles of prepolymer it is generally advantageous to employ a prepolymer which does not have an intrinsic viscosity any greater than about 0.4–0.45. Usually the prepolymer will have an intrinsic viscosity of no less than about 0.1 and preferably 0.15–0.4.

The powder buildup operation is conducted in an enclosed polymerizing zone wherein at least 5% of the volume is occupied by the particles. Such a zone can be a horizontal tube, upright cylinder or any other chamber through which inert gas can be conveniently moved across the surface of the particles.

There is no clear cut range of flow rates for the inert gas passing over the surface or through the prepolymer particles since the effectiveness of the flowing gas depends to a considerable extent on the geometry of the polymerizing zone. However, it apears that a range of from about 10 to about 1,000 ml. of inert gas per minute per gram of the solid particles covers about as much variation in flow rate as appears ordinarily practicable. An excessively high flow rate will obviously be economically wasteful since it will require employment of more heat in order to maintain the powder buildup conditions in the polymerizing range of temperatures.

The particles in the polymerizing zone can be advantageously heated at about from 40° to 80° C. below the melting point of the prepolymer. The most effective polymerization temperature depends upon the nature of the polyester and upon the type of catalyst employed. Generally the polymerization temperature is about 200–260° C. although higher and lower temperatures are operable such as 180–350° C. Surprisingly enough, it was discovered in regard to terephthalic polyesters that in some instances temperatures on the order of 200° C. and below lead to slightly colored polymer whereas high temperatures of about 220° C. or higher give colorless polymer under otherwise identical conditions.

According to one preferred method of practicing this invention a prepolymer is finely ground to form solid particles in the 40 to 70 mesh size which are heated in a horizontal glass or metal tube at the polymerization temperature while a stream of dry nitrogen is passed through the tube and over the bed of polyester particles until the desired increase in the molecular weight of the polyester is obtained. The degree and rate of molecular weight buildup of the prepolymer is somewhat dependent upon the particle size, the polymerization temperature, the rate of flow of the inert gas over the bed of prepolymer, the thickness of the bed of prepolymer, and the diameter of the reaction tube. Obviously, the concentration and the particular ester interchange catalyst present in the prepolymer will affect the rate of molecular weight buildup. It has been found that this process under optimum conditions provides high grade, substantially colorless polyesters which can be obtained with high intrinsic viscosities within relative short reaction periods of time and at temperatures far below the meltng points of the polyesters.

The particle size of the prepolymer is advantageously between 30 and 70 mesh although larger or smaller particles may be employed within the limits set forth above. Larger size particles tend to introduce discoloration and slow down the rate of molecular weight buildup. The presence of a very high proportion of particles passing 200 mesh (such as 25% or more) is undesirable since such particles tend to be picked up by the moving gas and carried away.

One way for accomplishing the powder buildup is to conduct the polymerization in apparatus which maintains the solid particles in a fluidized condition. Such apparatus is well known in the cement making and in the powdered coal handling industries as well as elsewhere. For example, an upright cylindrical fluidized blender can be employed to suspend and agitate particles with hot inert gas while the walls of the blender are maintained at a temperature adequate to heat the particles to accomplish the polymerization. Additional prepolymer can be added to such a blender on a continuous basis and built-up particles can be removed as desired.

Another device is to use a somewhat tilted hollow reaction tube which may have a corrugated cross section and which can be rotated around its longitudinal axis. Prepolymer powder can be introduced into the higher end of the tube and inert gas passed through the tube, preferably through the opposite end. The tube can be designed so that the particles of prepolymer will remain within the tube for desired period of time while the tube is being rotated and moving the particles downwardly according to the degree of slope of the tube. By using such a rotating tube apparatus the particles of built-up polymer have a substantially uniform intrinsic viscosity and are quite advantageously employed for products where a relatively narrow range of molecular weights is desirable such as in photographic film base or fibers.

The temperature at which the polymerization during the powder buildup is conducted should not be so high as to cause non-frangible agglomeration of the particles during the solid phase polymerizaton. The maximum temperature which can be employed will be determined by the precise conditions employed. By the avoidance of non-frangible agglomeration it is meant that the material should not fuse together completely but should remain in a form such that it is quite frangible and can readily be broken up after the polymerization has been completed. When the above-designated powder buildup phase 3 is being accomplished with a static bed the polymerization temperature can be further below the melting point of the polyester than when the bed is being agitated. As has already been pointed out the agitation can be accomplished by means of the inert gas (which can be heated) being passed through the particles of the solid polymer as in the case of fluidization. Agitation can also be accomplished by stirring the particles in an enclosed polymerizing zone or by other means such as when the previously described rotating tube is employed. Agitation is especially important if the depth of the polymer bed is 5 mm. or more. A static bed can be employed when the depth of polymer is less than 5 mm. and preferably no more than about 3 mm. Of course static beds having depths greater than 5 mm. could be employed with adverse effect upon the results achieved.

A preferred rate of flow of the inert gas over, around or through the particles of solid polymer is between about 25 and about 325 ml. of gas per minute per gram of solid particles although higher and lower rates of flow can be used such as from 10 to 1,000 ml. per minute per gram. Rates higher than 1,000 can be employed in some cases where the inert gas is being recirculated; in such cases it is considered that the rate is still no more than 1,000 since the recirculated gas is not considered in calculating the rate. When the polymer bed is static and is situated in a tube the range of flow rates is preferably from 25 to 325 with the lower rates of flow generally applicable when the reaction tube diameter is small. Relatively high flow rates may be required with larger reaction tubes in order to obtain the same degree of molecular weight buildup.

When a static bed of prepolymer is employed in a substantially horizontal tube the thickness of the bed can be between about 1% and 25% of the diameter of the reaction tube. Such a bed can be established within the larger sizes of reaction tubes by placing it upon a substantially horizontal and flat supporting surface across the lower half of the tube. Such a bed would then constitute at least 5% of the volume of the polymerizing zone above the supporting surface. The maximum volume of the bed in the zone in such a case would be limited by the practical problems associated with the flow of inert gas over the bed.

In cases where the polymerizing zone involves apparatus which fluidizes the particles it is possible for the fluidized material to occupy a fairly major proportion of the total polymerizing zone. Theoretically, it could occupy almost the entire zone. The same would be true when other devices were being used for agitating the prepolymer particles and passing the inert gas through the agitated mass. In such cases much of the volume of the polymerization zone is filled with the gas used to fluidize the particles and such gas occupies the interstices between the particles.

It is obvious that there are quite a number of the variations of the process of this invention among which would be the employment of mixtures of prepolymer particles using different prepolymers.

The practice of this invention provides a rapid, efficient process for obtaining colorless fiber and film forming polyesters having exceptionally high molecular weights by simple economical means whereby the complications of high-vacuum processes are avoided. In any case the melt stability of the polyesters obtained by the process of this invention is superior to that obtained by the ordinary manufacturing techniques. The process of this invention is well adapted to continuous operation.

This invention can be further illustrated by the following examples of preferred embodiment although it will be understood that these examples are included merely for purposes of illustration and are not intended to limit the scope of the invention unless otherwise specifically indicated.

*Example 1A*

This example demonstrates a method for preparing the polyester "prepolymers."

A mixture of 83.70 g. of the dibutyl ester of 4,4'-sulfonyldibenzoic acid, 5.84 g. of dimethyl succinate and 49.47 g. of 1,5-pentanediol was heated under an atmosphere of dry, oxygen-free nitrogen to 195° C. At this point 16 drops of a 2% solution of sodium titanium butylate in butanol was injected into the hot mixture. Ester interchange began almost immediately. The butyl alcohol formed was removed continuously by distillation. The temperature of the mixture was kept at 195–200° C. throughout the interchange reaction which required 80 minutes for completion. The temperature of the mixture was raised to 270° C. over a 27-minute period during which some of the excess 1,5-pentanediol distilled out. The pressure of the system was then gradually reduced to 1.5 mm. within 5 min. Heating at 265–270° C. was continued for 2 min. at 1.5 to 0.5 mm. Hg pressure. The vacuum was broken by bleeding in dry, oxygen-free nitrogen. The molten "prepolymer" was poured immediately into 500 ml. cold water whereupon it solidified to a glassy solid. The brittle solid was drained and was ground to small particles. After drying at 50° C. in a vacuum oven for 12 hr., the "prepolymer" was ground again to a particle size of 40 to 70 mesh. The inherent viscosity in a 60–40 phenol-tetrachloroethane mixture was 0.17.

*Example 1B*

A sample of the "prepolymer" prepared in Example 1A, comprised of 5 moles of 4,4'-sulfonyldibenzoic acid, 1 mole of succinic acid, and 6 moles of 1,5-pentanediol, was placed in a glass tube having a diameter of 22 mm. The bed of polymer was 2 mm. thick and was supported by aluminum foil. The tube was flushed with dry, oxygen-free nitrogen and then the flow of nitrogen was adjusted to 25 ml. per minute per gram of "prepolymer." The reaction tube was heated in a furnace over a 23-min. period to an internal temperature of 220° C. This temperature was maintained for 45 min. while nitrogen was passed continuously through the tube at the above flow rate. The tube was then removed from the furnace and allowed to cool. The resulting polyester was colorless and had an inherent viscosity of 0.99 in 60–40 phenol-tetrachloroethane. It could be melt spun into strong fibers.

*Example 2*

The procedure of Example 1B was followed except that the reaction tube had a diameter of 13.5 mm. The colorless polyester thus obtained had an inherent viscosity of 1.34.

The general procedure of Example 1B was used in the following examples which illustrate the effect of gas flow rate and temperature:

| Example | $N_2$ Rate, ml./min./g. | Temperature, °C. | Polymer Color | Polymer, I.V. |
|---|---|---|---|---|
| 3 | 325 | 220 | Colorless | 2.02 |
| 4 | 150 | 220 | Colorless | 1.77 |
| 5 | 75 | 220 | Colorless | 1.59 |

*Example 6A*

This example demonstrates a method for converting a low-melting, relatively amorphous "prepolymer" into a high-melting, relatively crystalline material. A polyester "prepolymer" comprised of 5 moles of 4,4'-sulfonyldibenzoic acid, 1 mole of terephthalic acid, and 6 moles of 2,2-dimethyl-1,3-propanediol was prepared by the general procedure of Example 1A. This "prepolymer," in the form of a 40–70 mesh powder, was placed in a mortar and treated with acetone. The chunks which formed on contact with the acetone were reground to a powder. Most of the acetone was allowed to evaporate while the "prepolymer" was ground. The resulting powder was stirred at room temperature with 50% aqueous acetone for 2 to 4 days. After filtering, the prepolymer was dried in a vacuum oven at 55° C. and then was rescreened to a particle size of from 40 to 70 mesh. The inherent viscosity was 0.23. The original or untreated "prepolymer" melted below 200° C. After the crystallization as described the melting point was above 260° C.

*Example 6B*

The crystalline "prepolymer" from Example 6A was placed in a glass tube having a diameter of 22 mm. The bed of polymer was 2 mm. thick and was supported by aluminum foil. The tube was flushed with dry, oxygen-free nitrogen and then the flow of nitrogen was adjusted to 300 ml. per minute per gram of "prepolymer." The reaction tube was heated within 30 min. to an internal temperature of 260±2° C. These conditions were maintained for 30 min. The resulting colorless polyester had an inherent viscosity of 0.75 in 60–40 phenol-tetrachloroethane and could be melt spun to give strong fibers. The inherent viscosity of the polyester was 0.92 and 0.99 after reaction periods of 1.0 and 1.5 hr., respectively.

*Example 7*

A polyethylene terephthalate "prepolymer" prepared by the method of Example 1A from dimethyl terephthalate and ethylene glycol and having an inherent viscosity of 0.19 was polymerized by the method of Example 1B. The colorless polyester had an inherent viscosity (I.V.) of 1.06.

*Example 8*

One part of finely ground (40 to 70 mesh) polyethylene isophthalate (I.V. 0.19) prepolymer prepared by the method of Example 1A from dibutyl isophthalate and ethylene glycol was intimately mixed with five parts of finely ground (40 to 70 mesh) polyethylene terephthalate (I.V. 1.06) prepared as in Example 7. The resulting mixture was polymerized by the method of Example 1B. The inherent viscosity of the colorless interpolymer thus obtained was 1.14. This polymer could be melt spun to give strong fibers. The copolymers obtained by this method appear to be substantially ordered in contrast to the randomness of similar copolymers prepared in the melt phase. In other words they had a segmented structure; see Kibler et al. application S.N. 801,705, filed on March 25, 1959, and Caldwell et al. application Serial No. 796,198, filed on March 2, 1959.

*Example 9*

Example 1 was repeated except that 8.24 g. of poly-N-tert-butylacrylamide (I.V. 0.41 dissolved in dimethylformamide) was added to the reaction mixture before the initial ester interchange reaction. The resulting "prepolymer" contained 3% of poly-N-tert-butylacrylamide based on the analysis for nitrogen and had an inert viscosity of 0.40. This "prepolymer," in the form of a 40 to 70-mesh powder, was subjected to polymerization following the method of Example 1B. The colorless, modified polyester thereby obtained had an inherent viscosity of 1.44.

*Example 10*

Example 1A was repeated except that 0.34 g. of methyl benzoate was added to the initial reaction mixture as a viscosity regulator. The "prepolymer" had an inherent viscosity of 0.19. This material was polymerized by the method of Example 1B to give a colorless polymer having an inherent viscosity of 0.97.

*Example 11*

Example 3 was repeated using dry air instead of nitrogen. A light tan polymer having an inherent viscosity of 1.09 was obtained. This polyester was melt spun to give useful fibers having properties essentially the same as when nitrogen was used as the gas except for the change in color.

*Example 12*

Propane was used in place of nitrogen in the procedure of Example 1B. A colorless, high-viscosity polyester was obtained.

*Example 13*

Carbon dioxide was used in place of nitrogen in the procedure of Example 1B to give a colorless, high-viscosity polyester.

*Example 14*

A mixture of nitrogen and helium was used in place of nitrogen in the procedure of Example 1B to give a colorless polymer having a high intrinsic viscosity.

*Example 15*

Example 1B was followed except that the "prepolymer" was agitated continuously throughout the polymerization reaction by employing a corrugated reaction tube which was rotated around its longitudinal axis on asbestos-wrapped rollers and which was heated by means of Chromalox radiant heaters. The resulting polyesters from various runs were colorless and had high inherent viscosities, viz. above 0.75 and usually well above 1.0.

*Example 16*

Example 15 was repeated except that a dry gas free of carbon monoxide obtained from burned natural gas was employed as the inert gas. The resulting polyester was colorless. Similar results were obtained when the dry inert gas was mixed with a small proportion of air. It was preferable to maintain the amount of oxygen in the mixed gas at less than 2%.

*Example 17*

The process described in Example 1 was repeated using other titanium catalysts within the scope set forth hereinabove in the specification whereby similar results were obtained. Mixtures of such titanium compounds with oxides of lead and/or antimony were also effectively employed. The same applies to other binary catalyst compositions preferably containing at least 50% by weight of a titanium compound.

The process described in Example 1 can also be conducted in a similar manner beginning with a mixture of 6.4 lbs. of dimethyl terephthalate, 0.65 lb. of succinic anhydride and 6.3 lbs. of 1,4-cyclohexanedimethanol (40% cis) and 15 cc. of a 28.8% solution of

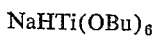

$$NaHTi(OBu)_6$$

in butanol. The condensation during the ester interchange step is conducted in a stainless steel reactor equipped with an agitator and preheated to 170° C. at the beginning followed by the temperature being increased during 50 mins. to 240° C. during which the methanol was distilled off. The temperature of the melt is then increased to 270° C. and the system carefully evacuated during 30 mins. After holding for 5 min. at 0.01–1.0 mm. pressure, the system is released to nitrogen and the low molecular weight prepolymer extruded into cold water. The dried prepolymer is pulverized to pass a 30 mesh screen. It has an I.V. of about 0.25. Samples of this prepolymer can be polymerized by heating in an aeration blender wherein the hot gas is introduced through a porous plate at the bottom and the aerated blended material is maintained at 260° C. for one hour after the temperature had become stabilized. The blender itself is heated as well as the inert gas in order to maintain the desired temperature for the powder build-up. A number of variations of this process can be used to give differences in the results depending upon the temperature employed, the flow rate of inert gas, the extent of recirculation of hot gas, etc. It is apparent that polyesters can be produced by such a process having I.V.'s of 0.75–0.85 and much higher which are substantially colorless. Usually a minimum I.V. of 0.85 can be achieved very quickly.

The invention has been described in detail with particular reference to preferred embodiments thereof, but it will be understood that variations and modifications can be effected within the spirit and scope of the invention as described hereinabove and as defined in the appended claims.

We claim:

1. A process for preparing a linear superpolyester of at least one glycol and at least one dibasic acid comprising at least 50 mole percent of an acid having two carboxyl radicals attached to a hexacarbocyclic nucleus, said superpolyester having an inherent viscosity in a mixture of 60% phenol and 40% tetrachloroethane of at least 0.5 and melting at from about 180° to about 350° C., comprising heating in an enclosed polymerization zone wherein at least 5% of the volume is occupied by particles of a solid prepolymer of said superpolyester having an inherent viscosity of from about 0.1 to about 0.45, which particles substantially completely pass a 20 mesh screen with less than 25% passing a 200 mesh screen, which prepolymer contains an organotitanium catalyst, said heating being at from 5° to 80° C. below the melting point of said prepolymer and between 175° and 300° C. in the presence of a dry gas selected from the group consisting of nitrogen, carbon dioxide, helium, propane, dried air, dried burnt natural gas and mixtures thereof which contain no more than about 0.1% by weight of carbon monoxide at about atmospheric pressure which flows through said zone at from about 10 to about 1,000 ml. of dry gas per minute per gram of said particles, any of said particles more than 5 mm. from the surface being agitated into contact with said dry gas, whereby a superpolyester having an inherent viscosity of at least 0.5 and also at least 0.3 unit greater than for said prepolymer is obtained within one hour of commencing said heating in said polymerization zone.

2. A process as defined by claim 1 wherein said glycol is selected from the group consisting of ethylene glycol, 1,5-pentanediol, 2,2-dimethyl-1,3-propanediol and 1,4-cyclohexanedimethanol, and said dibasic acid is selected from the group consisting of terephthalic acid and 4,4'-sulfonyldibenzoic acid and mixtures thereof with succinic acid.

3. A process as defined by claim 1 wherein said dry gas is essentially a mixture of nitrogen and carbon dioxide and contains less than 2% by volume of oxygen and less than 0.1% by volume of carbon monoxide.

4. A process as defined by claim 1 wherein said dry gas is dry air, whereby a substantially colorless polyester forms during the first 20 minutes of contact with said dry air and within a total time of one hour a light tan superpolyester having an inherent viscosity of at least 0.5 and also at least 0.3 unit greater than for said prepolymer is obtained within said one hour of commencing said heating in said polymerization zone.

5. A process as defined by claim 1 wherein said particles are agitated in contact with said dry gas by aeration means such that said particles are maintained in a fluidized condition.

6. A process as defined by claim 1 wherein said particles in said polymerization zone are maintained in a static bed less than 5 mm. in depth while said dry gas flows through said zone.

7. A process as defined by claim 1 wherein said particles of a solid prepolymer are (a) contacted with an organic volatile liquid, (b) heated until dry, and (c) introduced into said polymerization zone.

8. A process as defined by claim 7 wherein said volatile liquid is aqueous acetone.

9. A process as defined by claim 2 wherein said glycol is ethylene glycol and said dibasic acid is terephthalic acid.

10. A process as defined by claim 3 wherein said glycol is ethylene glycol and said dibasic acid is terephthalic acid.

11. A process as defined by claim 5 wherein said glycol is ethylene glycol and said dibasic acid is terephthalic acid.

12. A process as defined by claim 7 wherein said glycol is ethylene glycol and said dibasic acid is terephthalic acid.

13. A process as defined by claim 2 wherein said glycol is 1,4-cyclohexanedimethanol and said dibasic acid is terephthalic acid.

14. A process as defined by claim 3 wherein said glycol is 1,4-cyclohexanedimethanol and said dibasic acid is terephthalic acid.

15. A process as defined by claim 5 wherein said glycol is 1,4-cyclohexanedimethanol and said dibasic acid is terephthalic acid.

16. A process as defined by claim 7 wherein said glycol is 1,4-cyclohexanedimethanol and said dibasic acid is terephthalic acid.

17. A superpolyester of the process defined by claim 1.
18. A superpolyester of the process defined by claim 2.
19. A superpolyester of the process defined by claim 3.
20. A superpolyester of the process defined by claim 5.
21. A superpolyester of the process defined by claim 9.
22. A superpolyester of the process defined by claim 13.

References Cited in the file of this patent

UNITED STATES PATENTS

| | | |
|---|---|---|
| 2,720,502 | Caldwell | Oct. 11, 1955 |
| 2,727,881 | Caldwell et al. | Dec. 20, 1955 |
| 2,758,915 | Vodonik | Aug. 14, 1956 |
| 2,828,290 | Caldwell | Mar. 25, 1958 |